(12) United States Patent
Beard

(10) Patent No.: US 9,360,846 B2
(45) Date of Patent: Jun. 7, 2016

(54) SERVOMOTOR CONTROL SYSTEMS AND METHODS

(71) Applicant: Horizon Hobby, Inc., Champaign, IL (US)

(72) Inventor: Paul Beard, Bigfork, MT (US)

(73) Assignee: Horizon Hobby, LLC, Champaign, IL (US)

( * ) Notice: Subject to any disclaimer, the term of this patent is extended or adjusted under 35 U.S.C. 154(b) by 247 days.

(21) Appl. No.: 13/865,042

(22) Filed: Apr. 17, 2013

(65) Prior Publication Data

US 2014/0312824 A1    Oct. 23, 2014

(51) Int. Cl.
| | | |
|---|---|---|
| G05D 1/00 | (2006.01) | |
| G05B 5/01 | (2006.01) | |
| G05B 19/19 | (2006.01) | |
| A63H 30/04 | (2006.01) | |
| G05B 11/40 | (2006.01) | |

(52) U.S. Cl.
CPC ........ *G05B 5/01* (2013.01); *A63H 30/04* (2013.01); *G05B 11/40* (2013.01); *G05B 19/19* (2013.01); *G05B 2219/37318* (2013.01)

(58) Field of Classification Search
CPC ..... H02P 6/002; H02P 21/0053; H02P 21/06; H02P 2207/05; H02P 29/0066; G05B 15/02; G05B 23/0254; G05B 2201/0214; G05B 19/02
USPC ................... 318/581, 588, 590, 612, 400.26, 318/400.29, 400.34, 280, 282, 286, 362, 318/375
See application file for complete search history.

(56) References Cited

U.S. PATENT DOCUMENTS

| | | | | |
|---|---|---|---|---|
| 4,334,221 | A * | 6/1982 | Rosenhagen et al. | 463/6 |
| 5,043,640 | A * | 8/1991 | Orton | 318/16 |
| 5,103,146 | A * | 4/1992 | Hoffman | 318/16 |
| 5,361,024 | A * | 11/1994 | Wisner et al. | 318/588 |
| 7,579,796 | B2 * | 8/2009 | Hofer | 318/276 |
| 8,330,583 | B2 * | 12/2012 | Beard et al. | 340/12.22 |

* cited by examiner

*Primary Examiner* — Bentsu Ro
*Assistant Examiner* — Thai Dinh
(74) *Attorney, Agent, or Firm* — Barnes & Thornburg LLP

(57) ABSTRACT

Systems and methods for controlling servomotors are described herein. Servomotor controllers and related control circuitry are configured to generate control signals for controlling the servomotor. The control signals include directional control signals to control the rotational direction and position of the servomotor, and power control signals control the rotational speed and/or torque of the servomotor.

8 Claims, 3 Drawing Sheets

SERVOMOTOR CONTROL SYSTEMS AND METHODS

FIELD

The disclosed systems and methods relate generally to servomotors and servomotor control systems. Disclosed embodiments relate to servomotors and servomotor control systems for radio-controlled (RC) vehicles.

BACKGROUND

A servomotor is a rotary actuator comprising a rotational shaft, a motor to rotate the shaft, and a sensor to detect the position of the shaft. Servomotors are used in a variety of applications, including applications related to radio-controlled (RC) vehicles. For example, servomotors can be used to control steering mechanisms for (i) RC cars and trucks (turning wheels right or left), (ii) RC planes (positioning wing flaps and rudders), (ii) RC helicopters (positioning swashplates and tail rudders), and (iii) other similar RC vehicle applications.

In operation, a servomotor receives a control signal that represents a desired rotational position of the shaft. The control signal may be analog or digital depending upon the design of the servomotor. In response to the control signal, the servomotor applies power to the motor to rotate the shaft to the desired position. The shaft typically rotates about +/−60° (120° total) around an axis of rotation, but the actual range of rotation can vary depending upon the design of the servomotor and its intended application. The sensor (e.g., a potentiometer or similar sensor) detects the actual rotational position of the shaft which can be fed back through a control loop for setting the rotational position of the servomotor shaft.

SUMMARY

When using servomotors to control RC vehicles, it is desirable to have the ability to rapidly and accurately rotate the servomotor shaft from one rotational position to a next rotational position while eliminating or at least substantially minimizing "over steer" in connection with transitioning from one rotational position to the next.

Similarly, it is also desirable to have the ability to hold the servo motor shaft firmly and precisely in a desired rotational position, which can be challenging when the mechanisms attached the servomotor (e.g., wheel steering mechanisms, helicopter flash-plates, plane wing flaps, plane/helicopter/boat rudders, etc.) are subjected to comparatively strong countervailing physical forces that tend to move the servomotor shaft away from the desired rotational position.

The disclosed servomotor control systems and methods are designed to rotate the servomotor shaft rapidly and accurately from one rotational position to a next rotational position, eliminate or at least substantially minimize "over steer" in connection with transitioning from one shaft position to the next, and firmly hold the servomotor shaft in a fixed or substantially fixed rotational position in the presence of comparatively strong countervailing forces that would tend to move the servomotor shaft from its desired rotational position in the absence of a firm rotational position holding ability.

Some embodiments include a servomotor and a servomotor controller configured to generate one or more control signals for controlling the servomotor. In operation, the control signals include directional control signals to control the rotational direction and position of the servomotor and power control signals to control the rotational speed or torque of the servomotor. In a preferred embodiment, the power control signal is based at least in part on (i) the rotational speed of the servomotor determined by a back electromotive force measured at the servomotor, and (ii) a rotational direction of the servomotor.

Other embodiments include a servomotor and control circuitry configured to generate control signals for controlling the servomotor. In operation, the control signals are based on: (i) servomotor braking caused by shorting two terminals of an H-bridge circuit configured to control the rotational speed and rotational direction of the servomotor; (ii) the servomotor rotational speed based at least in part on a back electromotive force measured at the servomotor, and (iii) the servomotor rotational direction.

Still further embodiments include methods for generating one or more control signals for controlling a servomotor. The control signals include directional control signals to control the rotational direction and position of the servomotor and power control signals to control the rotational speed or torque of the servomotor. In a preferred embodiment, the power control signal is based at least in part on (i) the rotational speed of the servomotor determined by a back electromotive force measured at the servomotor, and (ii) a rotational direction of the servomotor.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
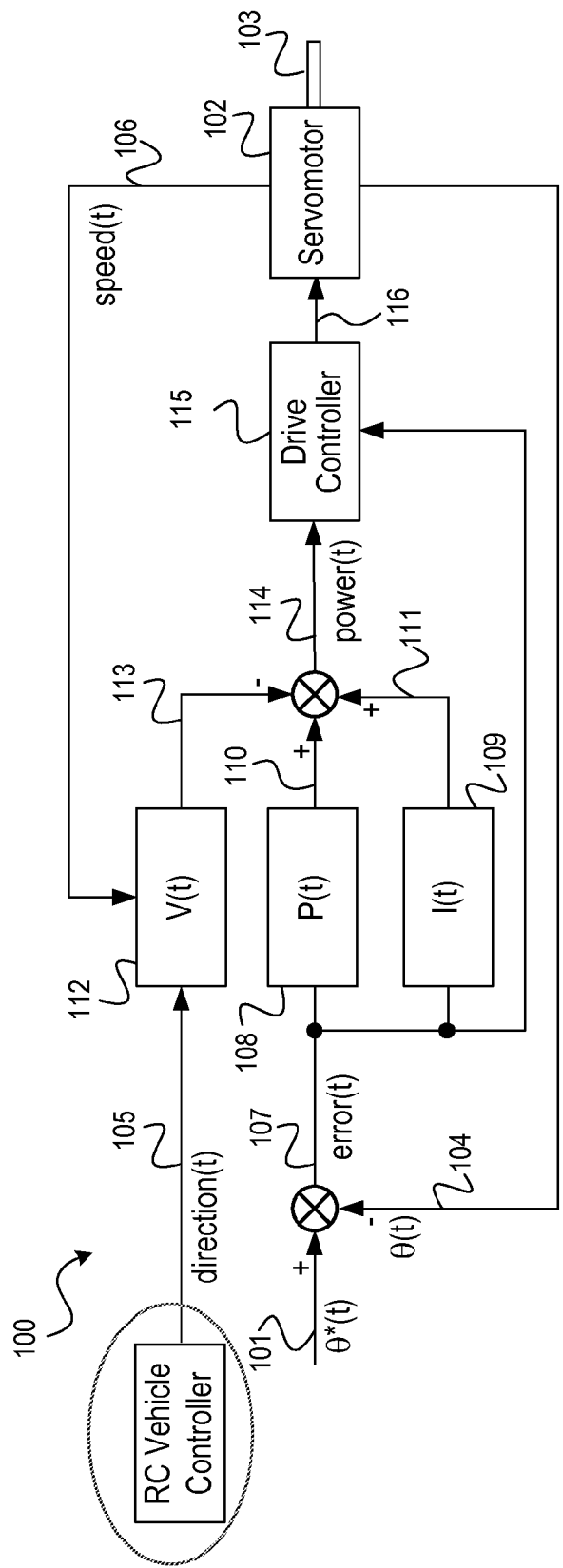
FIG. 1 illustrates a control loop according to an example embodiment.

FIG. 1 illustrates a control loop 100 for generating control signals for application to drive controller 115. Drive controller 115 is configured to control the rotational speed and rotational direction of a servomotor 102 according to an example embodiment. In one preferred embodiment, the control loop 100 is implemented via circuitry and/or one or more microcontrollers installed within an RC vehicle (not shown).

Inputs to control loop 100 include (i) a desired rotational position 101 of the servomotor shaft 103 (e.g., in radians), (ii) a measured rotational position 104 of the servomotor shaft 103 (e.g., in radians), (iii) a rotational direction 105 of the servomotor 102 (i.e., clockwise or counter-clockwise), and (iv) a rotational speed 106 of the servomotor 102 (e.g., in radians/millisecond). In operation, the control loop 100 uses these inputs to determine (i) the rotational direction (clockwise or counter-clockwise) that the drive controller 115 will turn the servomotor 102 and (ii) the power that the drive controller 115 will use to turn the servomotor 102, resulting in a particular rotational speed or torque.

To determine the rotational direction (clockwise or counter-clockwise) that the drive controller 115 will turn the servomotor 102, the control loop 100 determines a positional error 107 of the servomotor shaft 103 by subtracting the rotational position 104 of the servomotor shaft 103 from the desired rotational position 101 of the servomotor shaft 103. In a preferred embodiment, the control loop 100 calculates the positional error 107 at a given time (t) according to Equation 1:

$$\text{error}(t) = \theta^*(t) - \theta(t) \quad \text{Equation 1:}$$

In Equation 1, the desired rotational position at time (t) is $\theta^*(t)$ and the actual measured rotational position at time (t) is $\theta(t)$. The control loop 100 uses the sign (positive or negative) of error(t) to determine the rotational direction (clockwise or counter-clockwise) that the drive controller 115 will turn the servomotor 102.

For example, assume servomotor 102 is configured to rotate 180° (or from 0 to 3.14 radians), clockwise rotation is considered positive rotation, and counter-clockwise rotation is considered negative rotation. If the desired rotational position at time (t) is 1.5 radians and the measured rotational position at time (t) is 1.4 radians, then error(t) is 1.5−1.4=0.1 radians. Because error(t) is positive, the drive controller 115 will rotate the servomotor 102 clockwise toward the desired rotational position. Similarly, if $\theta^*(t)$ is 1.4 and $\theta(t)$ is 1.5, the error(t) is 1.4−1.5=−0.1 radians, and thus, the drive controller 115 will rotate the servomotor 102 counter-clockwise. Finally, if error(t) is zero because $\theta^*(t) = \theta(t)$, then the drive controller 115 will hold the servomotor 102 in its present position $\theta(t)$. Thus, in operation, the drive controller 115 rotates the servomotor (clockwise or counterclockwise) or holds the servomotor in a particular rotational position based on the positional error 107.

To determine the power that the drive controller 115 will use to turn the servomotor 102 (resulting in a particular rotational speed or torque), the control loop generates a power control signal 114 based on (i) the positional error 107 of the servomotor shaft, (ii) the rotational speed of the servomotor 102, and (iii) the rotational direction (clockwise or counter-clockwise) of the servomotor 102. The power control signal 114 corresponds to the power that the drive controller 115 uses to turn to servomotor 102. In a preferred embodiment, the control loop 100 calculates the power control signal at a given time (t) according to Equation 2.

$$\text{power}(t) = P(t) - V(t) + I(t) \quad \text{Equation 2:}$$

In Equation 2, P(t), V(t), and I(t) are functions that each contribute to the final value of the power control signal 114. In particular, P(t) is a proportional function implemented at block 108 to generate a proportional component 110 of the power control signal 114, I(t) is an integral function implemented at block 109 to generate an integral component 111 of the power control signal 114, and V(t) is a velocity function implemented at block 112 to generate a velocity component 113 of the power control signal 114.

The proportional component 110 causes the control loop 100 to adjust the power control signal 114 based on the magnitude of the positional error 107. In a preferred embodiment, the proportional component 110 is generated at block 108 according to Equation 3.

$$P(t) = K_P \times (\text{error}(t)) \quad \text{Equation 3:}$$

In Equation 3, $K_P$ is a proportional gain factor and error(t) is the positional error 107 at time (t) calculated according to Equation 1. The proportional block 108 multiplies the proportional gain factor $K_P$ by the positional error 107 to produce a proportional component 110 of the power control signal 114. The proportional gain factor $K_P$ determines the weight that the proportional component 110 will have in the final power control signal 114.

The integral component 111 causes the control loop 100 to adjust the power control signal 114 based on the sum of the positional errors (the sum of all positive errors and negative errors) over a defined timeframe, thereby increasing the precision of the control loop 100. In a preferred embodiment, the integral component 111 is generated at block 109 according to Equation 4

$$I(t) = K_I \times \int (\text{error}(t)) dt \quad \text{Equation 4:}$$

In Equation 4, $K_I$ is an integral gain factor and $\int(\text{error}(t))dt$ is the integral of the positional error 107 over a defined timeframe, i.e., the sum of the positional errors over time. The integral block 109 multiplies the proportional gain factor $K_I$ by the integral of the positional error 107 to produce an integral component 111 of the power control signal 114. The integral gain factor $K_I$ determines the weight that the integral component 111 will have in the final power control signal 114.

The velocity component 113 causes the control loop 100 to adjust the power control signal 114 based on to the current rotational velocity of the servomotor 102, thereby improving the performance of the control loop 100. In a preferred embodiment, the velocity component 113 is generated at block 112 according to Equation 5

$$V(t) = K_T \times \text{direction}(t) \times \text{speed}(t) \quad \text{Equation 5:}$$

In Equation 5, $K_T$ is a velocity gain factor, direction(t) is the rotational direction 105 of the servomotor 102, and speed(t) is the rotational speed 106 of the servomotor 102.

In some embodiments, the rotational direction 105 is based at least in part on an input received via a radio-controlled (RC) vehicle controller (not shown) associated with the RC vehicle (not shown). For example, if a joystick or other steering mechanism on the RC vehicle controller is positioned to cause the servomotor 102 to turn clockwise, then the rotational direction 105 input used by velocity block 112 might be +1 for implementations where +1 denotes a clockwise direction and −1 denotes a counter-clockwise direction. In other embodiments, the rotational direction 105 is based at least in part on directional control signals generated by the drive controller 115. For example, in embodiments where the drive controller 115 comprises an H-bridge for controlling the rotational direction of the servomotor 102, the rotational direction 105 can be based on the H-bridge state (see FIG. 2).

In some embodiments, the rotational speed 106 of the servomotor 102 is based at least in part on a back electromotive force measured at the servomotor. In operation, the current applied across the servomotor terminals causes the servomotor 102 to rotate. As the servomotor 102 rotates, it generates current and builds up a back EMF voltage which can be measured and correlated with the rotational speed of the servomotor 102.

The velocity block 112 multiplies the velocity gain factor $K_V$ with the rotational velocity of the servomotor 102 to produce a velocity component 113 of the power control signal 114. The velocity gain factor $K_V$ determines the weight that the velocity component 113 will have in the final power control signal 114.

The proportional gain factor $K_P$, the integral gain factor $K_I$, and the velocity gain factor $K_V$ can be determined via trial and error, via Ziegler-Nichols tuning methods, or via other known control system tuning methods. In operation, the values selected for the gain factors $K_P$, $K_I$ and $K_V$ are based upon the physical characteristics of the servomotor being controlled by the control loop and the specific application for which the servomotor is being used. In some embodiments, it is desirable to determine $K_P$, then $K_D$ and then $K_I$. However, the gain factors could be determined in a different order under some circumstances.

Figure 2:
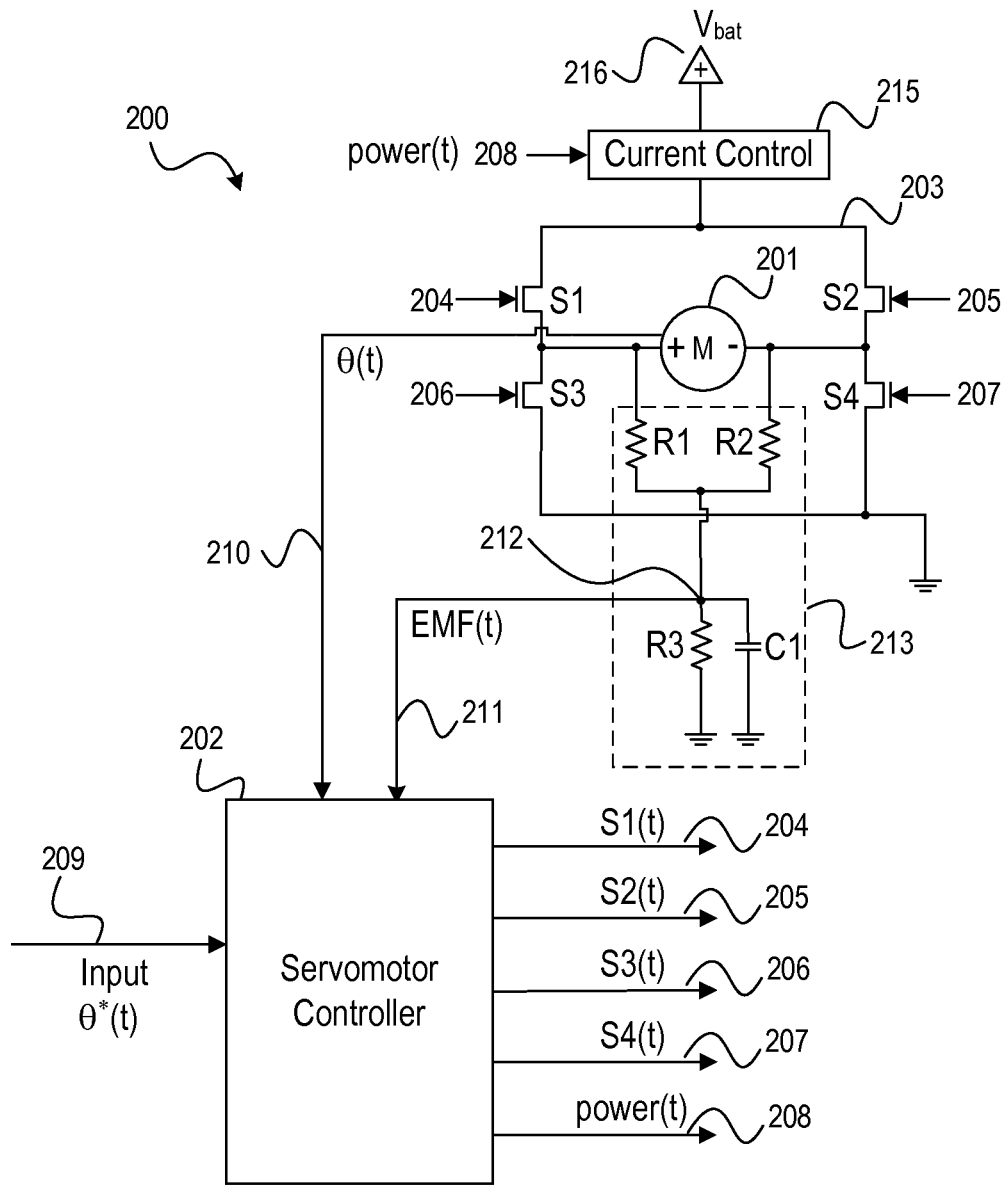
FIG. 2 illustrates a system comprising a servomotor, a servomotor controller, and an H-bridge according to an example embodiment.

FIG. 2 illustrates a system 200 comprising a servomotor 201 with a servomotor shaft (not shown), a servomotor controller 202, and an H-bridge 203 according to an example embodiment. In preferred embodiments, the system 200 is configured to implement control loop 100 shown and described with respect to FIG. 1. In other embodiments, system 200 may implement similar or different control loops. In preferred embodiments, the system 200 is installed within an RC vehicle (not shown) such as an RC car/truck, RC plane, RC helicopter, RC boat, or similar RC vehicle. However, the system 200 could be used for other applications.

The servomotor 201 of FIG. 2 is substantially similar to the servomotor 102 shown and described with respect to FIG. 1. In particular, the servomotor 201 includes a rotational shaft (not shown) a motor to rotate the shaft, and sensor to detect the position of the shaft for providing feedback signal 210 to the servomotor controller 202.

The servomotor controller 202 is configured to generate control signals 204-208. The control signals 204-208 include (i) four directional control signals 204-207 and (ii) one power control signal 208. Alternative configurations may include more or fewer control signals.

In operation, the servomotor controller 202 generates the directional control signals 204-207 for opening and closing switches S1-S4 of the H-bridge 203, thereby controlling the current applied to the servomotor 201, which in-turn controls the rotational direction (clockwise or counter-clockwise) and rotational position of the servomotor 201. The directional control signals 204-208 are based at least in part on (i) an input signal 209 received (directly or indirectly) from an RC vehicle controller (not shown) associated with the RC vehicle in which system 200 is installed and (ii) a position feedback signal 210 corresponding to the measured rotational position θ(t) of the shaft of the servomotor 201. Although the input signal 209 includes at least a desired rotational position of the θ*(t), the input signal 209 may include additional information or data for use by the servomotor controller 202.

In preferred embodiments, the servomotor controller 202 calculates the positional error, i.e., error(t), between the desired rotational position of the θ*(t) of the servomotor shaft and the measured rotational position θ(t) of the servomotor shaft according to Equation 1. The servomotor controller 202 uses the sign (positive or negative) of the positional error (i.e., error(t)), to generate control signals 204-207 for opening/closing switches S1-S4 of H-bridge 203, thereby controlling (i) the rotational position of the servomotor shaft and (ii) the rotational direction of the servomotor 201 while rotating the servomotor shaft from one rotational position to another.

The four switches S1, S2, S3, and S4 of H-bridge 203 are independently opened and closed by directional control signals 205, 206, 207, and 208, respectively. In particular, signal 205 opens/closes switch S1 in H-bridge 203, signal 206 opens/closes switch S2 in H-bridge 203, signal 207 opens/closes switch S3 in H-bridge 203, and signal 208 opens/closes switch S4 in H-bridge 203. The switches S1-S4 in FIG. 2 are depicted as transistors, but other comparable switching mechanisms could be used as well.

Table 214 of FIG. 2 illustrates the behavior of the servomotor 201 in response to the four H-bridge states shown in the table, where each state corresponds to a particular combination of opened and closed switches, S1-S4. For example, when S1 and S4 are closed and S2 and S3 are open, current flows from the positive terminal of the servomotor 201 to the negative terminal of the servomotor 201, thereby causing the servomotor 201 to turn clockwise. When S2 and S3 are closed and S1 and S4 are open, current flows from the negative terminal of the servomotor 201 to the positive terminal of the servomotor 201, thereby causing the servomotor 201 to turn counter-clockwise. The servomotor 201 brakes (i.e., stops moving) when either (i) S1 and S2 are closed and S3 and S4 are opened or (ii) S3 and S4 are closed and S1 and S2 are opened.

These two "servo brake" states utilize the back EMF generated by the rotation of the servomotor 201 to hold the servomotor shaft firmly in a fixed or substantially fixed rotational position even in the presence of strong countervailing forces that would ordinarily tend to move the servomotor shaft from its fixed rotational position if the H-bridge 203 were not in a "servo brake" state. In addition, when the H-bridge 203 is in either of the two "servo brake" states, current does not flow across the terminals of the servomotor 201 to cause the servomotor 201 to rotate.

In one embodiment, clockwise rotation is considered positive rotation, counter-clockwise rotation is considered negative rotation, and error(t) is calculated according to Equation 1. Thus, when error(t) is positive, the servomotor controller 202 (i) activates signals 204 and 207 to close switches S1 and S4 of H-bridge 203 and (ii) deactivates signals 205 and 206 to open switches S2 and S3 of H-bridge 203. This H-bridge state enables current to flow across the servomotor 201 from the positive terminal to the negative terminal, thereby causing the servomotor 201 to rotate clockwise toward the desired rotational position. When error(t) is negative, the servomotor controller 201 (i) activates signals 205 and 206 to close switches S2 and S3 of H-bridge 203 and (ii) deactivates signals 204 and 207 to open switches S1 and S4 of H-bridge 203. This H-bridge state enables current to flow across the servomotor 201 from the negative terminal to the positive terminal, thereby causing the servomotor 201 to rotate counterclockwise toward the desired rotational position. Finally, if error(t) is zero because θ*(t)=θ(t), then the servomotor controller 202 places the H-bridge 203 into one of the two "servo brake" states to hold the servomotor 201 in its present position θ(t) by (i) activating signals 204 and 205 while deactivating signals 206 and 207 or (ii) activating signals 206 and 207 while deactivating signals 204 and 205.

The servomotor controller 202 also generates the power control signal 208. In operation, the servomotor controller 202 sends the power control signal 208 to the current control block 215. The current control block 215 controls the amount of current that flows from the power supply 216 to the H-bridge 203 (and thus to the servomotor 201) based on the value of the power control signal 208. The amount of current supplied to the servomotor 201 controls the rotational speed and/or torque of the servomotor 201. For example, increasing the current applied to the servomotor 201 will increase the rotational speed or generate more torque whereas decreasing the current applied to the servomotor 201 will decrease the rotational speed or generate less torque.

In operation, the servomotor controller 202 determines the value of the power control signal 208 based on: (i) the positional error of the servomotor shaft corresponding to the difference between the actual rotational position θ(t) of the servomotor shaft (from feedback signal 210) and the desired rotational position θ*(t) of the servomotor shaft (from input 209), (ii) the velocity of the servomotor, and (iii) the integral of the error over time. In preferred embodiments, the servomotor controller 202 determines the value of the power control signal 208 according to Equation 2, and the controller 202 determines the proportional, integral, and velocity components P(t), I(t), and V(t), respectively, according to Equations, 3, 4, and 5, respectively.

The direction(t) value used for calculating the velocity component V(t) according to Equation 5 can be determined in multiple ways. In some embodiments, input signal 209 may include directional information that can be used for determining the direction(t) value. For example, if a joystick, steering wheel, or other similar mechanism on an RC vehicle controller (not shown) is positioned to cause the servomotor 201 to turn clockwise, then direction(t) used by the servomotor controller 202 to calculate V(t) might be +1 for implementations where +1 denotes a clockwise direction and −1 denotes a counter-clockwise direction. In other embodiments, the direction(t) may be based on the state of the H-bridge 203 at time (t), as determined by directional control signals 204-207. For example, if the H-bridge 203 is configured at time (t) to cause the servomotor 201 to turn clockwise, then direction(t) used by the servomotor controller 202 to calculate V(t) would be +1. Similarly, if the H-bridge 203 is configured at time (t) to cause the servomotor 201 to turn counter-clockwise, then direction(t) used by the servomotor controller 202 to calculate V(t) would be −1. Finally, if the H-bridge 203 is configured for one of the two "servo brake" states, then direction(t) would be 0 (and thus, V(t) would be 0 because the servomotor 201 is held in a fixed position. In further embodiments, the direction(t) could be based on a weighted combination of (i) direction information contained with user input 209 and (ii) the state of the H-bridge 203.

The speed(t) value, corresponding to the rotational speed of the servomotor 201 for use in calculating the velocity component V(t) in Equation 5, is determined by measuring the back EMF at the servomotor 102. In operation, the current applied across the servomotor terminals causes the servomotor 102 to rotate. As the servomotor 102 rotates, it generates current and builds up a back EMF voltage which can be measured and correlated with the rotational speed of the servomotor 102 to obtain the speed(t) value. In control system 200, the EMF(t) feedback signal 211 is a voltage measured at node 212 of circuit 213. Circuit 213 includes a voltage divider comprising resisters R1 and R2 and a filter comprising resister R3 and capacitor C1. In some embodiments, the values for R1, R2, and R3 are 21 kΩ, and the value for C1 is 0.01 µF. However, other suitable combinations of resistors and capacitors could be used as well.

Figure 3:
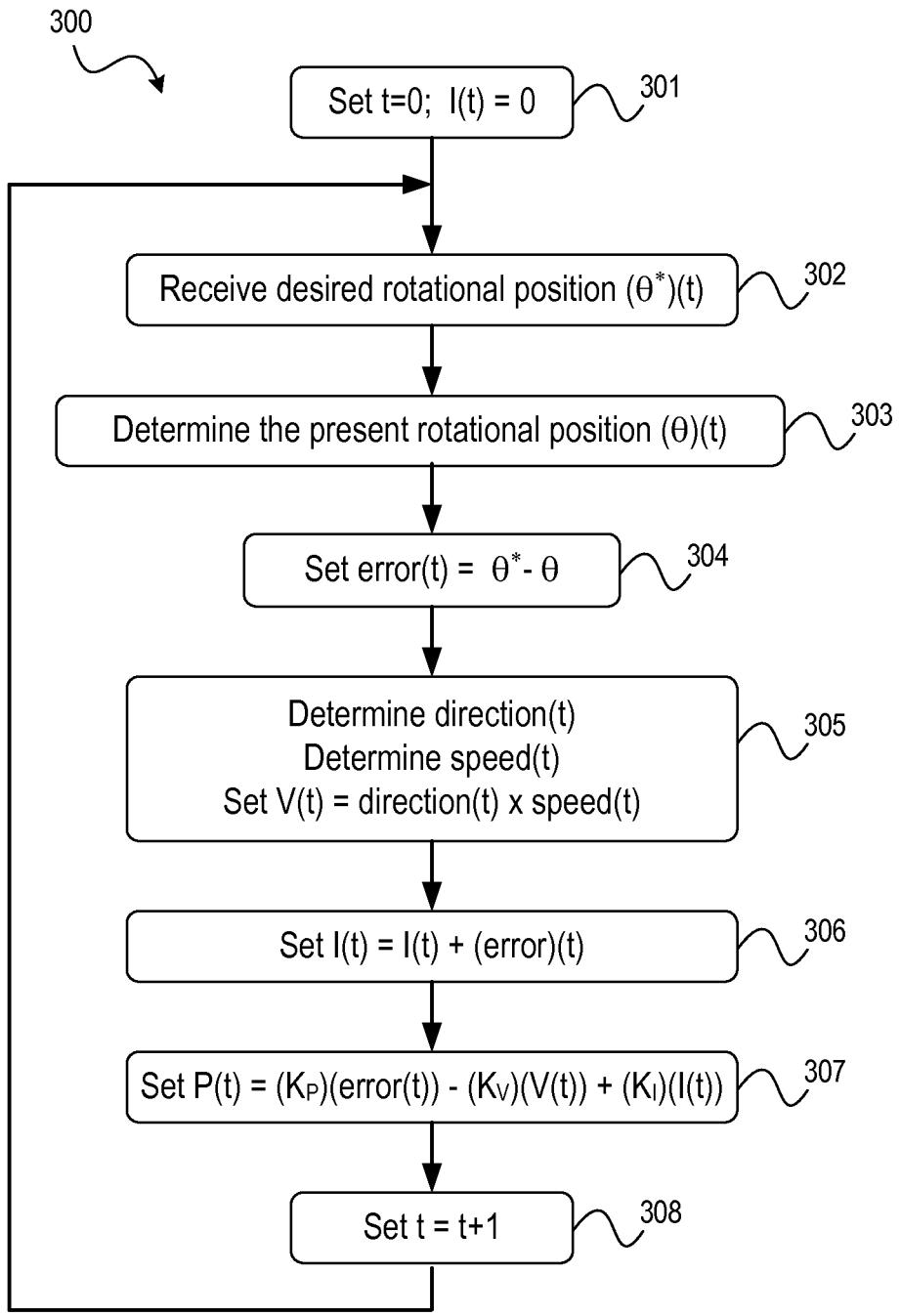
FIG. 3 illustrates a control system algorithm according to an example embodiment.

FIG. 3 illustrates an algorithm 300 for use by the servomotor controller 202 in determining the value of the power control signal 208 according to one example embodiment.

Algorithm 300 begins at logic block 301, where time is set to 0 and the integral component I(t) is set to 0. The integral component I(t) is set to 0 at time t=0 because there is no accumulated error at time t=0.

At block 302, the desired rotational position θ*(t) is received via any of the mechanisms described herein, and at block 303, the present rotational position θ(t) is received via any of the mechanisms described herein. At block 304, error (t) is calculated by subtracting the present rotational position θ(t) from the desired rotational position θ*(t).

At block 305, direction(t) and speed(t) are determined according to any of the mechanisms described herein, and V(t) is set equal to the product of direction(t) and speed(t).

At block 306, I(t) is set equal to I(t)+error(t) to add the accumulated error to the integral component. Then, at block 307, the value of the power signal 307, P(t), is set equal to the weighted sum of the error(t), V(t), and I(t) components. Each component (error(t), V(t), and I(t), is weighted according to its corresponding gain factor, $K_P$, $K_V$, and $K_I$, respectively. The values for gain factors $K_P$, $K_V$, and $K_I$ can be determined via trial and error, via Ziegler-Nichols tuning methods, or via other known control system tuning methods.

At block 308, t is set to t+1 to increment the time interval over which the algorithm 300 operates. In some embodiments, t may be anywhere from microseconds to a few milliseconds. In a preferred embodiment, t is in a range from about 5.5 ms.

While particular aspects and embodiments are disclosed herein, other aspects and embodiments will be apparent to those skilled in the art in view of the foregoing teaching. For example, while the embodiments are described with respect to applications for RC vehicles, the disclosed systems and methods are not so limited. The various aspects and embodiments disclosed herein are for illustration purposes only and are not intended to be limiting, with the true scope and spirit being indicated by the following claims.

What is claimed is:

1. A radio controlled (RC) vehicle comprising:
   a servomotor comprising a servomotor shaft;
   a servomotor controller configured to generate one or more control signals for controlling the servomotor, wherein at least one of the control signals is a power control signal based at least in part on: (i) a rotational speed of the servomotor based at least in part on a back electromotive force measured at the servomotor, and (ii) a rotational direction of the servomotor;
   wherein at least one of the control signals is a directional control signal based at least in part on an input received via a radio-controlled (RC) vehicle controller associated with the RC vehicle; and
   wherein the power control signal is based at least in part on: (i) a proportional factor multiplied by a positional error, wherein the positional error is the difference between a desired rotational position of the servomotor shaft and a present rotational position of the servomotor shaft, (ii) a velocity factor multiplied by the product of a rotational speed of the servomotor and a rotational direction of the servomotor, and (iii) an integral factor multiplied by an integral of the servomotor positional error over time.

2. The RC vehicle of claim 1, wherein the power control signal is determined according to the equation: power(t)=P(t)−V(t)+I(t);
   wherein P(t)=$K_P$(error(t)), wherein $K_P$ is a proportional gain factor, wherein error(t)=θ*(t)−θ(t), wherein θ*(t) is the desired rotational position of the servomotor shaft, and wherein θ(t) is the measured rotational position of the servomotor shaft;
   wherein V(t)=$K_V$×direction(t)×speed(t), wherein $K_V$ is a velocity gain factor, wherein direction(t) is the direction of the servomotor, and wherein speed(t) is the speed of the servomotor; and
   wherein I(t)=$K_I$×∫(error(t))dt, wherein $K_I$ is an integral gain factor, and wherein ∫(error(t))dt corresponds an integral of the positional error.

3. A radio controlled (RC) vehicle comprising:
a servomotor comprising a servomotor shaft;
a servomotor controller configured to generate one or more control signals for controlling the servomotor, wherein at least one of the control signals is a power control signal based at least in part on: (i) a rotation speed of the servomotor based at least in part on a back electromotive force measured at the servomotor, and (ii) a rotational direction of the servomotor; and
wherein the one or more control signals comprise one or more directional control signals, and wherein the RC vehicle further comprises:
an H-bridge circuit comprising four H-bridge terminals configurable to at least four states in response to the one or more directional control signals generated the servomotor controller; and
a voltage divider configured to measure a voltage corresponding to a back electromotive force (EMF) generated by the rotation of the servomotor;
wherein the first state enables current to flow across the servomotor from a first H-bridge terminal to a third H-bridge terminal to rotate the servomotor in a first direction;
wherein the second state enables current to flow across the servomotor from a second H-bridge terminal to a fourth H-bridge terminal to rotate the servomotor in a second direction;
wherein the third state creates a short across the first and second H-bridge terminals to cause the servomotor to brake; and
wherein the fourth state creates a short across the third and fourth H-bridge terminals to cause the servomotor to brake.

4. The RC vehicle of claim 3, wherein the servomotor controller is configured to correlate the measured voltage corresponding to the back EMF with the rotational speed of the servomotor.

5. A system comprising:
a servomotor comprising a servomotor shaft; and
control circuitry configured to generate one or more control signals for controlling the servomotor and a rotational position of the servomotor shaft, wherein the one or more control signals are based at least in part on: (i) servomotor braking caused by shorting two terminals of an H-bridge circuit configured to control a rotational speed and a rotational direction of the servomotor; (ii) a servomotor rotational speed based at least in part on a back electromotive force measured at the servomotor, and (iii) a servomotor rotational direction;
wherein at least one control signal includes a power control signal determined according to the equation: $power(t)=P(t)-V(t)+I(t)$;
wherein $P(t)=K_P(error(t))$, wherein $K_P$ is a proportional gain factor, wherein $error(t)=\theta^*(t)-\theta(t)$, wherein $\theta^*(t)$ is the desired rotational position of the servomotor shaft, and wherein $\theta(t)$ is the measured rotational position of the servomotor shaft;
wherein $V(t)=K_V \times direction(t) \times speed(t)$, wherein $K_V$ is a velocity gain factor, wherein $direction(t)$ is the direction of the servomotor, and wherein $speed(t)$ is the speed of the servomotor; and
wherein $I(t)=K_I \times \int(error(t))dt$, wherein $K_I$ is an integral gain factor, and wherein $\int(error(t))dt$ corresponds an integral of $error(t)$.

6. A method of controlling a servomotor comprising a servomotor shaft, the method comprising:
determining a present rotational direction of the servomotor;
determining a present rotational speed of the servomotor based at least in part on a back electromotive force measured at the servomotor;
determining a present rotational velocity of the servomotor based at least in part on the determined rotational speed and determined rotational direction;
generating at least one power control signal for controlling an amount of current applied to the servomotor based at least in part on the determined rotational velocity; and
applying at least one servomotor control signal to the servomotor based at least in part on the at least one power control signal;
wherein the rotational direction of the servomotor is based at least in part on an input received from a radio-controlled (RC) vehicle controller associated with an RC vehicle;
calculating a positional error based on the difference between an actual rotational position of the servomotor shaft and a desired rotational position of the servomotor shaft;
calculating an integral of the servomotor positional error over time; and
wherein the at least one power control signal is based at least in part on the rotational velocity, the calculated positional error, and the calculated integral of the positional error.

7. The method of claim 6, wherein the value of the at least one power control signal determined according to the equation: $power(t)=P(t)-V(t)+I(t)$;
wherein $P(t)=K_P(error(t))$, wherein $K_P$ is a proportional gain factor, wherein $error(t)=\theta^*(t)-\theta(t)$, wherein $\theta^*(t)$ is the desired rotational position of the servomotor shaft, and wherein $\theta(t)$ is the measured rotational position of the servomotor shaft;
wherein $V(t)=K_V \times direction(t) \times speed(t)$, wherein $K_V$ is a velocity gain factor, wherein $direction(t)$ is the direction of the servomotor; and wherein $speed(t)$ is the speed of the servomotor; and
wherein $I(t)=K_I \times (error(t))dt$, wherein $K_I$ is an integral gain factor, and wherein $\int(error(t))dt$ corresponds an integral of the positional error.

8. The method of claim 6, wherein determining a present rotational speed of the servomotor based at least in part on a back electromotive force measured at the servomotor comprises:
measuring a voltage at a node joining a voltage divider positioned across two terminals of the servomotor and an RC filter; and
correlating the measured voltage with a servomotor rotational speed.

* * * * *